United States Patent [19]
Naylor et al.

[11] Patent Number: 5,981,053
[45] Date of Patent: Nov. 9, 1999

[54] TAMPER RESISTANT MAGNETIC STRIPES

[75] Inventors: Richard Brian Naylor; Donald J. Sharp, both of Albuquerque, N.Mex.

[73] Assignee: Sandia Corporation, Albuquerque, N.Mex.

[21] Appl. No.: 08/132,078

[22] Filed: Oct. 5, 1993

[51] Int. Cl.$^6$ ........................................... G11B 5/80
[52] U.S. Cl. ................ 428/323; 428/328; 428/694 BC; 428/694 RE; 428/900; 427/130; 427/548; 427/550; 427/551; 427/553; 427/599; 235/493; 283/82
[58] Field of Search ...................... 428/694 BC, 694 RE, 428/900, 323, 328; 235/493; 283/82; 427/130, 548, 550, 551, 553, 599

[56] References Cited

U.S. PATENT DOCUMENTS

| | | | |
|---|---|---|---|
| 3,790,754 | 2/1974 | Black et al. | 235/61.7 B |
| 3,873,975 | 3/1975 | Miklos et al. | 340/149 A |
| 3,878,367 | 4/1975 | Fayling et al. | 235/61.12 M |
| 3,927,393 | 12/1975 | Fayling | 340/149 A |
| 3,982,276 | 9/1976 | Roos | 360/17 |
| 4,097,279 | 6/1978 | Whitehead | 96/27 R |
| 4,143,297 | 3/1979 | Fischer . | |
| 4,158,862 | 6/1979 | Michaud et al. | 360/56 |
| 4,180,837 | 12/1979 | Michaud et al. | 360/18 |
| 4,197,563 | 4/1980 | Michaud et al. | 360/56 |
| 4,239,959 | 12/1980 | Gutterman | 235/493 |
| 4,546,037 | 10/1985 | King . | |
| 4,548,862 | 10/1985 | Hartman . | |

OTHER PUBLICATIONS

Fayling et al "Magnetic Recording Properties of SmCo$_5$" IEEE Transactions of Magnetics vol. Mag 14 No. 5 Sep. 1978.

"Magnets," Cat. No. 592, 4 pp, Dura Magnetics, Inc., Sylvania, Ohio 43560, (1992).

"Watermark Magnetics Tape Manufacturing Process," Product Data Sheets, Marketing Notes, and Technical Notes, Thorn Secure Science International, Swindon, England, 28 pp. (1991).

"Magnetic Techniques Study," Burroughs Corp., Pooli, PA, U.S. Department of Commerce, National Technical Information Service, Aug., 1977.

*Primary Examiner*—Stevan A. Resan
*Attorney, Agent, or Firm*—George H. Libman

[57] ABSTRACT

This invention relates to a magnetic stripe comprising a medium in which magnetized particles are suspended and in which the encoded information is recorded by actual physical rotation or alignment of the previously magnetized particles within the flux reversals of the stripe which are 180° opposed in their magnetic polarity. The magnetized particles are suspended in a medium which is solid, or physically rigid, at ambient temperatures but which at moderately elevated temperatures, such as 40° C., is thinable to a viscosity permissive of rotation of the particles therein under applications of moderate external magnetic field strengths within acceptable time limits.

22 Claims, 6 Drawing Sheets

In a magnet, most or all magnetic domains are oriented in the same direction so that all their magnetic fields sum together.

In a magnetic stripe, a code is formed by reversing the magnetic domains. Each time the domain polarity is reversed, a flux reversal is created.

Magnetic Head Output Voltage (Constant Card Velocity)
Aiken bi-phase encoding.

MULTIPLE PARALLEL MAGNETIC HEADS

REQUIRED LASER TRACE PATH TO ENCODE THE FOLLOWING BINARY PATTERN

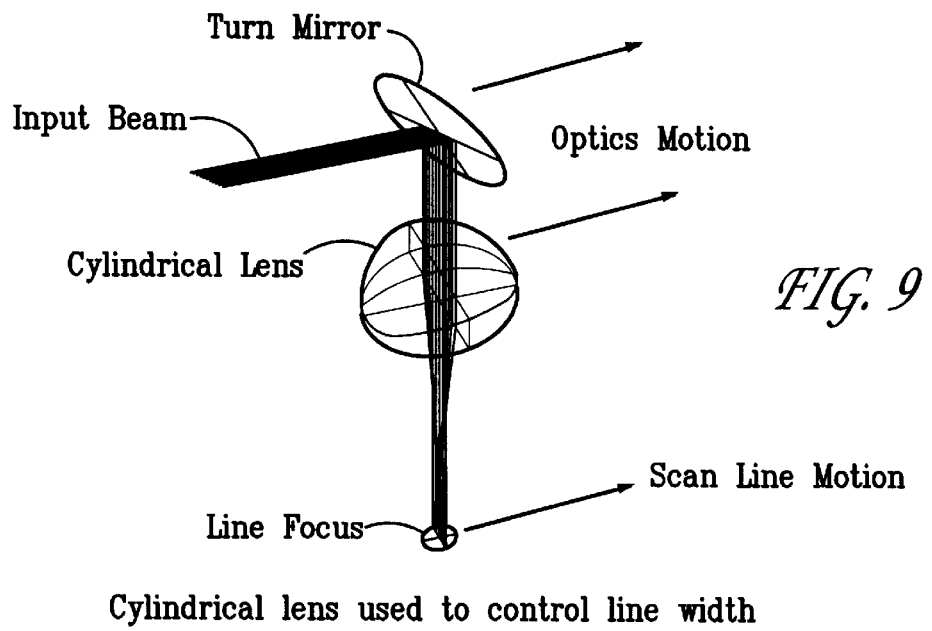
Cylindrical lens used to control line width
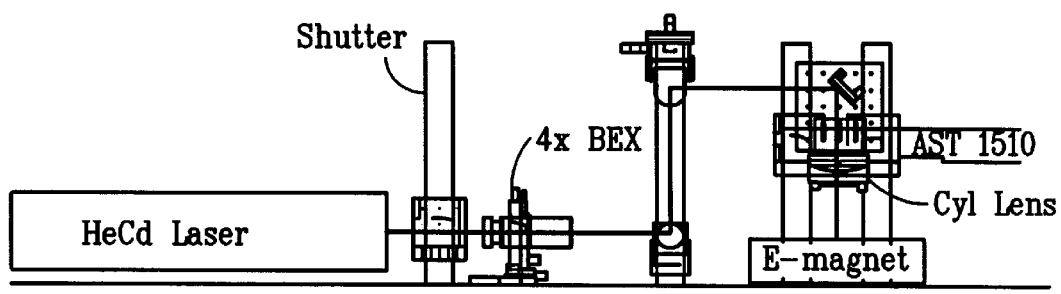
Optical train schematic

TAMPER RESISTANT MAGNETIC STRIPES

The United States Government has rights in this invention pursuant to Contract No. DE-AC04-76DP00789 between the Department of Energy and Sandia National Laboratories.

BACKGROUND OF THE INVENTION

Cards carrying a stripe of magnetic tape encoded with information are widely used for various purposes, i.e., automated commercial transactions such as credit purchase, ATM cards and personal identification for controlled access areas. Conventional magnetic stripes consists of fine particles of a ferromagnetic material suspended in a matrix of an organic polymer which is usually supported by a inert plastic film. The magnetic particles are not free to move within the polymer matrix after formation of the stripe is completed. Information encoding is accomplished by altering the magnetic properties of the entrapped particles in selected areas of the stripe in a predetermined pattern by magnetic domain wall rotation.

Magnetic domain wall rotation (MDWR) is by far the most common technique for encoding magnetic stripes. Virtually all credit and ATM cards are encoded this way. Most access control badges are also encoded by magnetic domain wall rotation. To prepare a stripe for encoding by MDWR, a magnetic field must be applied to the stripe of sufficient strength to rotate the magnetic poles inside of the entrapped magnetic particles so that substantially all particles in the stripe are aligned identically, as illustrated in FIG. 1. In this state the stripe is encodable but not yet encoded. To encode the stripe, in a given region of the stripe the magnetic polarity of substantially all the particles therein, by application of a magnetic field to that region, are reversed in polarity such as to be 180° opposed to the polarity of regions adjacent thereto. These localized areas of aligned but opposed magnetic domains are known as flux reversals. See FIG. 2. The most common type of code used on magnetic stripes is Aiken-Bi-Phase or F/2F encoding which requires two flux reversals for every bit of binary data on the stripe. To write a message, the polarities of the bits are flip-flopped to form the desired message. A "1" is formed by reversing the polarities in two adjacent flux reversals, and a "0" is formed by aligning two flux reversals. See FIG. 3. Today the most widely utilized magnetic card decoders are those designed to sense and read 180° flux reversals within the stripe.

Encoding magnetic stripes by magnetic domain wall rotation (MWDR) is very useful because it can be written and read using quite simple equipment. The main limiting factor is that only low to medium magnetic strength materials can be used as the particles. This property of magnetic strength is known as flux or coercivity. For example, common credit card of today is recorded using magnetic materials with coercivities of about 270–300 Oersteds (the units used to measure coercivity).

The reasons why higher coercivity materials have not been not used are several. One of these problems has been the physical characteristics of the high coercivity magnetic material itself. Another primary reason why higher coercivity magnetic stripe materials are not used for encoding by magnetic domain wall rotation is that the higher coercive force of such materials requires a stronger recording magnetic field to alter its magnetic pole orientations. While a credit card can be altered (erased or garbled) by a common 800–1,000 Oersted household magnet, it is theorized that a magnetic stripe manufactured from magnetic materials with coercivities much higher than 5,000 Oersteds would require a magnetic head constructed of very expensive and exotic materials, such as a superconducting material, to encode or re-encode it. This is stated in theory since no magnetic heads of this type have been constructed. Because of this fact, it is highly unfeasible, if not impossible, to encode magnetic materials whose coercivities exceed 5,000 Oersteds by MDWR.

The relative ease by which a standard credit or ATM card can be encoded, erased or re-encoded due to its low coercivity magnetic particles has given rise to some serious problems. An ever increasing problem of concern is the production of counterfeit cards by the magnetic alteration of the encoded information of an otherwise legitimately issued card.

A need for a tamper resistant magnetic stripe exists in many areas of industry. One is that of the credit and debit card industry. Counterfeiting and fraud are already at alarming levels, and growing. More alarming is that much counterfeiting and altering of credit cards is conducted by professional and well financed counterfeiters. A need for modifications in the existing crime preventative approaches is clearly recognized throughout the credit card industry. This industry alone represents a multi-billion dollar segment of the business community that is demanding improvements in existing data authentication practices.

A second industry sector that would greatly benefit directly from a tamper resistant magnetic stripe is the positive identification and access control community. Due to high labor cost, a trend in today's high-tech society is the desire to have machines, rather than security personnel, verify the validity of ID badges. A media that currently is most commonly used to contain personal data on an access credential is magnetic tape, but for the reasons stated the magnetic tape has very little inherent protection against fraud and counterfeiting. Most companies that sell identification badges include a magnetic stripe on the badge as a standard feature. This is being done because an increasing number of companies that require employees to wear positive ID badges are following the trend to use automated entry control portals to control or restrict access into and out of their facilities. This trend toward automated entry portals and the resultant need for increased data security is also directly applicable to government security issues.

To combat the counterfeiters, several techniques have been attempted over the prior years. Some of these techniques include encrypting the data on the stripe, encoding a security checksum from the magnetic jitter of the data, and overlaying the magnetic stripe with a holographic diffraction pattern. However, for the reasons stated previously, the use of very high coercivity magnetic particles (i.e., greater than about 5,000 Oersteds) has not been considered to be a practical alternative to F/2F encode stripes, since conventional magnetic heads are incapable of producing high enough magnetic fields to rotate the magnet domain walls of such entrapped very high coercivity magnetic particles. To encode a stripe containing very high coercivity magnetic particles would require a physical rotation of the particles themselves, as opposed to a change in the polarity of the magnetic domain of the particle.

Over the years some techniques have been examined by which magnetic stripes can be produced and encoded by magnetic particle rotation within the medium in which the particles are suspended, after the encoding of which the medium is rigidified to prevent subsequent particle rotation and alternation of the encoding. Unfortunately, the particle rotation methods previously investigated by industry suffer from various problems. One problem is that they require the encoding to be performed as the badges or cards are produced.

Such efforts to date directed to the design of a tamper-resistant or tamper-detectable magnetic stripe card have been at least two fold. For cards which would be readable by a F/2F encodement reader, magnetic particles having coercivities of about 3,600 to 4000 Oe have been used in the stripe. At one time this presented greater, although by no means insurmountable, difficulties to one deliberately attempting to alter the legitimately encoded information. Namely an external magnetic field of greater strength was required, such as a high strength electromagnet, to deliberately alter the legitimate encoding. However, to even first legitimately encode such card required greater magnetic field strength by the encoder. Generally such cards were utilized wherein security access concerns were paramount and overrode concerns of cost, economics or convenience. Today, however, since the market is saturated with high field strength encoders (i.e., capable of 3,600 Oersteds), such higher coercivity tapes no longer provide extra security against deliberate tampering. They do, however, still provide a higher level of accidental erasure protection.

Most of the other efforts to produce a secure magnetic stripe such as jitter encoding, oblique encoding, holographic overlays, infrared paint overcoats, etc., depend upon a code reader of special design which is incapable of reading F/2F card encodements. For techniques which have attempted to utilize some form of particle rotation feature as its security device, the security channel of the stripe is security data encoded by particle rotation to create magnetic domains polarities which are 90° out of phase with each other according to a predetermine pattern. Thereafter the medium of the stripe is treated to rigidify it and lock the particles in place. Unless the magnetism of the particles is erased, any attempt to alter the security channel encodement by MDWR is unavailing since the reader for the security channel can only read the 90° phase difference encodement created by the locked position of the particles. Even though the particle positioning within all of the stripe may have the 90° out of phase security pattern, the stripe is otherwise encodeable by MDWR in the regular fashion and this unsecured data is alterable, erasable and tamperable. Security therefor depends upon keying the unsecured MDWR data with the unalterable 90% out of phase security data. In one such methodology a polymer-solvent slurry of particles is encoded and locked in place by removal of the solvent during manufacture of the stripe itself. In another, a photo-polymerizable monomer/oligomer slurry of particles is encoded by polymerization of selective areas to lock particles therein in place after which the particles in unpolymerized areas are rotated 90° by exposure to an external magnetic field and thereafter the entirety of the stripe is photopolymerized to rigidify it.

Unfortunately, none of the methodologies for producing tamper proof mag cards is wholly satisfactory. Desirably a tamper resistant "mag" card (or stripe carried thereon) should be readable by a F/2F designed decoder and it should be quickly encodeable apart from and long after the manufacture of the stripe itself. That is, it should be shippable and storable in unencoded but encodeable form. None of the prior methods of particle rotation encodement provide for or permit of this. Also, once encoded with a F/2F readable code, this code should be unalterable by anything substantially less in strength than a magnetic head constructed of exotic materials as discussed earlier.

SUMMARY OF THE INVENTION

This invention relates to a magnetic stripe comprising a medium in which magnetized particles are suspended and in which the encoded information is recorded by actual physical rotation or alignment of the previously magnetized particles within domains of the stripe which are 180° opposed in their magnetic polarity. The magnetized particles are suspended in a medium which is solid, or physically rigid, at ambient temperatures but which at moderately elevated temperatures, such as 40° C., is thinable to a viscosity permissive of rotation of the particles therein under applications of moderate external magnetic field strengths within acceptable time limits. This permits rotation and alignment of the subject magnetized particles in response to an externally applied magnetic pattern. Thereafter the liquid or viscous medium is caused to harden, crosslink, or polymerize such that the magnetically aligned particles thereafter portray and retain a permanent record induced by the magnetizing or encoding device. Magnetic particles are selected to have a sufficiently high coercivity, or threshold of magnetization, to resist attempts to erase or re-encode the data by MDWR of the particles.

Although the magnetic matrix material could itself be fabricated into the card or badge, due to the fact that it is generally a more expensive stock compared to other materials that can serve as the card stock, it is preferred to form the magnetic matrix material as a stripe upon a badge/card stock or as a tape which may be affixed to a card or badge.

For practical use considerations it is desirable to fabricate a magnetic stripe that can be encoded by an approved issuing agency, on-site, at some later date. This post-production encoding is accomplished by the use of a prefabricated stripe which contains very high-coercivity particles (i.e., greater than 5,000 Oe) suspended in an irradiation curable medium which before being cured is physically rigid at ambient conditions, but is conveniently converted to a low viscosity state (i.e., 1,200 poise or less) by the temporary application of heat. The low viscosity state of uncured regions of the medium permits selected regions of the medium to be cured while in uncured regions particle rotation or alignment may be accomplished as part of the process of encodement after which the total medium is cured to render the positioning of the magnetic particles unalterable.

BRIEF DESCRIPTION OF THE DRAWINGS

FIG. 9 illustrates the use of a cylindrical lens in a laser system for encoding a magnetic stripe of this invention.

FIG. 10 schematically illustrates an encoder for magnetic stripes of this invention which employs a cylindrical lens arrangement as shown in FIG. 9.

DESCRIPTION OF THE PREFERRED EMBODIMENTS

Figure 1:
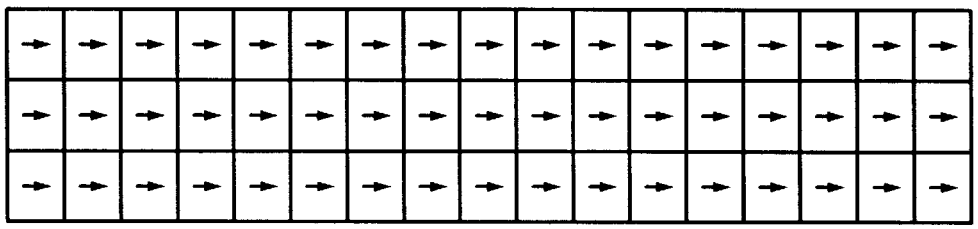
FIG. 1 illustrates the directionality of the magnetic domains of the magnetic particles within a magnetic stripe which has been exposed to a magnetic field to commonly orient the directionality of each.
Figure 2:
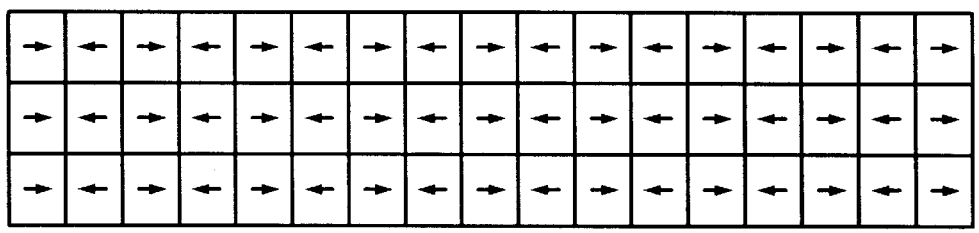
FIG. 2 illustrates the directionality of the magnetic domains of the magnetic particles with in a magnetic stripe as in FIG. 1 after exposure of selected regions thereof to a magnetic field to reverse the directionality of the magnetic domains thereof (either by MDWR of physically entrapped particles, as per the prior art methods, or by physical rotation of the particles themselves as per this invention) to create flux reversals.
Figure 3:
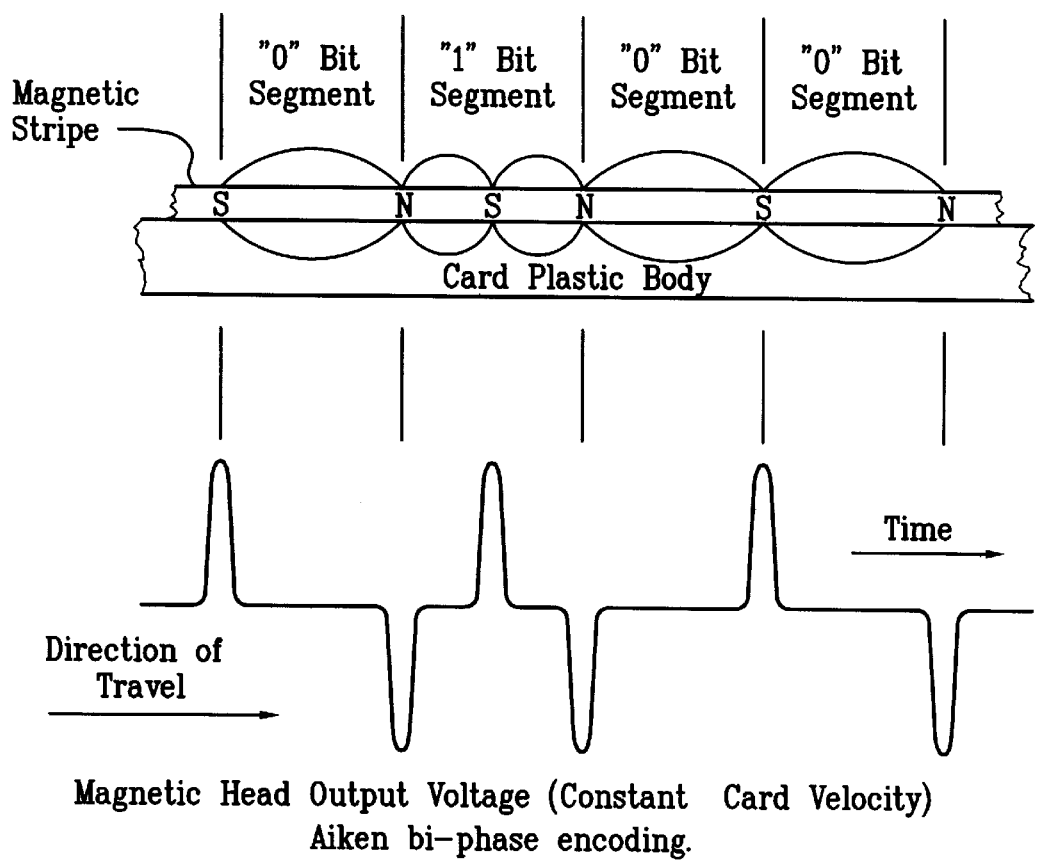
FIG. 3 illustrates the binary value of "four," 0100, as an F/2F encodement on a magnetic stripe, as such encoding would be read by the head output voltage of a conventional F/2F card reader.

This invention comprises a magnetic matrix material which after being fabricated in the form of a tape, stripe or the like may later be F/2F encoded with a magnetic pattern and subsequently treated to render such F/2F encoded magnetic pattern tamper resistant. The magnetic matrix material broadly comprises a curable medium which is solid at ambient temperature and is capable of low viscosity until cured and magnetizable particles of very high coercivity (i.e., greater than 5,000 Oersteds) suspended in the uncured medium wherein said particles are magnetized and substantially all magnetic domains in the uncured medium are oriented in the same direction. In this form the magnetic matrix material is encodeable although not yet encoded. This unencoded magnetic matrix material is subsequently encodeable with a magnetic pattern by subjecting specific areas of the material to conditions which cause a reversal of the position of the magnetized particles therein, and accordingly a reversal of the directionality of the magnetic domains thereof, with respect to the directionality of the magnetic domains of adjacent areas. In this form the magnetic matrix material is magnetically F/2F encoded but as yet not completely cured. The encoded matrix material is thereafter cured by causing the medium thereof to rigidify by crosslinking induced by energetic irradiation of the entity of the matrix material.

Tamper resistances of the magnetic encoding is provided by selecting as the magnetizable particles compositions having a coercivity of at least 5 kOe, which particles after particle rotation encoding are locked into their encoding pattern by rigidifying the medium in which they are suspended. Thereafter, any attempt to alter the pattern of magnetic domains created by these physically positioned particles would require that the cured magnetic matrix material be subjected to magnetic field strengths that can only be achieved with a high strength magnetic head of exotic construction, an expensive and sophisticated item of equipment not likely to be subject to ready access by the criminal element.

More specifically, this invention comprises an encodeable magnetic matrix material which can be magnetically encoded by particle rotation with an F/2F code and thereafter rendered tamper resistant; methods for fabricating the encodeable magnetic matrix material; methods for encoding such material and rendering the F/2F encoding thereof tamper resistant. Broadly described, the processes comprise the preparation of the magnetizable particles, their suspension in a curable medium capable of low viscosity until cured, the physical directional alignment of the aligned magnetic particles within the uncured medium, the selective physical rotation of some of the suspended magnetic particles to reverse the directionality of their magnetic domains by 180° relative to other suspended particles which are not permitted to physically rotate to thereby create a predetermined F/2F magnetic code within the medium, and rigidification of the entirety of the medium containing the F/2F magnetic code.

Magnetic Material Preparation

To produce a tamper resistant magnetic stripe via particle rotation in accordance with this invention, a very high coercivity magnetic powder must be used. Herein the term stripe is intended to include all physical configurations of the magnetic matrix material which are commonly employed to carry data, such as tapes, disks and the like. The material selected for production of the magnetic powder should have a coercivity of at least about 5 kOe, preferably of at least about 8 kOe, and more preferably of at least about 10 kOe. Further the material must be producible in the form of fine particles of an average particle size in the range of 1–10 microns, preferably less than 5 microns, and more preferably less than 2 microns. In its fine powder form the material should not be oxidizable or should be capable of a passivation treatment to render it non-oxidizable without deleterious consequences to its magnetic properties.

Illustrative of the materials which are suitable for use as such magnetic particles are rare earth metal-transition metal compounds and rare earth metal-ion-boron compounds of the empirical formula $RM_x$, $R_2M_{17}$, and $R_2Fe_{14}B$ wherein R is Y, a rare earth metal of atomic number from 57 to 71 or a mixture thereof; M is Mn or a Group VIII transition metal (per the Group designations of Periodic Table of the Elements, CAS version, CRC Handbook of Chemistry and Physics, 68th Edition, CRC Press, Inc., Boca Raton, Fla.); x is 1 to 5 and preferably x is 1, 2 or 5. For purposes of imparting improved properties to the particle materials various amounts of Co, Al, Ga, Nb or mixtures thereof may be incorporated as desired. Materials having nominal formulas which are deviations from the above given empirical formulas wherein x is specifically 1, 2 or 5 may also be used and are intended to be included and described by the above given empirical formulas.

Two very high coercivity materials that are preferred are $SmCo_5$ (known as samarium-cobalt) and $Nd_2Fe_{14}B$ (neodymium-iron-boron). Both of these materials have intrinsic coercivities of well over 10 kOe and can be easily ground into a fine powder. Melt-spun $Nd_2Fe_{14}B$ ground to particles in the 1–10 micron size range has a measured intrinsic coercivity of 14 kOe. $Nd_2Fe_{14}B$ as a ground powder of this size is of a platelet-like shape, so the size range refers to the circular diameter of the platelet shape of the fine particles.

Both $SmCo_5$ and $Nd_2Fe_{14}B$ are air sensitive, especially in fine powder form wherein they can be pyrophoric. Chemical reactions of the particle's surface with the air can also cause degradation in the material's intrinsic coercivity. Passivating the surfaces of particles so that they are stable may be accomplished by heating the powder in nitrogen at a few hundred degrees Celsius to form a nitride on the surface of the particles. This layer prevents the magnetic material from becoming exposed to air and therefore prevents it from degrading.

Matrix Medium

As the medium within which the very high coercivity magnetic particles are suspended, a material is chosen which is solid, or in other words physically rigid, at ambient temperatures, but which at 40° C. has a viscosity of 1,200 poise or less and which, upon exposure to energetic irradiation, is curable by polymerization and/or crosslinking reactions to a solid which is not flowable at any temperatures. The material selected as the medium may, for example, be a photopolymerizable resin system comprising monomers, oligomers, prepolymers and mixtures thereof which contain photoinitiators and crosslinking agents. At ambient temperatures, typically meaning temperatures not exceeding 32° C. (90° F.) the material should be physically rigid, meaning that absent the application of any extrinsic stress thereto it undergoes no change in form and does not distort. A physically rigid material generally has a viscosity of at least about 2,000 poise. However, the material should also be chosen to have a viscosity at 40° C. of 1,200 poise or less, preferably 1,000 poise or less but at such temperature of 40° C. greater than 300 poise. Upon curing the material should have a high degree of toughness, hardness, and abrasion resistance. Preferably the material should be chemically compatible with the compositions typically used as a carrier substrates for tape formation or for formation of the card or badge stock.

The resin should contain a photoinitiator and, preferably, a photocrosslinking agent. Preferably both the initiator and, if present the crosslinking agent, should have an optical extinction coefficient in the UV range and also have a high reciprocity failure level.

Many polymeric resin systems have heretofore been developed for use as a photoresistant coating which are suitable photopolymerizable and/or crosslinkable resin materials for use in this invention. Examples of such resin systems which are suitable include alkyl ester prepolymer resins, polyvinyl cinnamate derivatives and prepolymers, vinyl esters containing cinnamylidene, polysulfones, and the like. One of ordinary skill in the art, without undue experimentation, would now be able to select from among the existing photoresistant coating resin systems a curable polymeric resin having the requisite properties as described above for use in this invention.

A preferred curable polymeric resin for use as the medium is a photocurable urethane acrylate resin, such as those marketed by the Sartomer Co. of Exton, Pa. under the trade designation of Craynor. These resins are preferred because they are composed of monomeric, oligomeric and polymeric units comprising a polyurethane backbone which carries a plurality of photo curable acrylate functionalities. The Craynor resins are available in a variety of viscosity grades ranging from 1,000 poise (about the viscosity of molasses) to 2,000 poise which is solid, or physically rigid, at ambient temperatures. The solid grade Sartomer Craynor resin is readily thinable by heating to 40° C. to a lower viscosity which is in the range of a liquid viscosity, i.e., 1,200 poise or less, at which magnetic viscosity particle rotation may readily be accomplished within reasonable times under application of moderate magnetic field strengths. Because of the polyurethane backbone, once the resin is photocured it possesses a high degree of toughness, hardness and abrasion resistance and is chemically compatible with typical substrate carrier materials and badge stock materials.

Illustrative but not limiting of the type of photoinitiator suitable for use in the resin systems useful in this invention are the Irgacure line of photosensitizers marketed by Ciba Giegy. Examples of these products: Irgacure 651, Irgacure 184, Irgacure 500 and 907; all show approximately equal photocuring absorption responses, but their optical extinction coefficients peak at different portions of the UV spectrum ranging from 250 to about 320 nm. This variance in peak absorption allows optimal energy coupling with the output of a narrow band light source such as a laser. All of these activating agents require about 250 mJ/cm$^2$ of UV energy to cause satisfactory cross-linking of a thin coating of polymer (such as a magnetic stripes). The most preferred photoactivator is Irgacure 907 which is 2-methyl-1-(4-(methythio)phenyl)-2-(4-morpholinyl)-1-propanone. This is due to the fact that its UV absorption spectrum peaks very close to the output of commercially available HeCd lasers, which in a preferred method of encoding, is preferred at this time.

It should be noted at this point that once the photoinitiator is added to the resin/magnetic particle mixture, the resin should be isolated from UV radiation. UV light is present in sunlight as well as most forms of indoor lighting. Special non-UV lighting (red or yellow lighting is usually sufficient) may be used in the facilities where the photosensitive resin/magnetic particle mixture is produced.

To achieve a consistent mixture of the magnetic particles and polymer, the magnetic particles may be added to the polymer in an unmagnetized state. The resin may be temporarily thinned (by addition of a solvent for the polymer) or heated to allow the particles, photoinitiator, and other optional agents to be evenly spread throughout the mixture. While the resin is in this liquid state the magnetic particles may have enough freedom of movement to allow them to coagulate, forming clumps, if the particles are magnetized prior to addition to the resin. If the magnetic particles are not magnetized upon their mixing into the resin, then they will have to be magnetized (poled) once the stripe material has been formed or applied onto the badge stock.

The resin/magnetic powder mixture is preferably prepared to contain from about 1 to about 20 volume percent of a magnetic powder of from about 0.5 to about 20 micron diameter for various particle morphologies; i.e., the particle size should not be less than the magnetic domain size of the particular magnetic material used. The photoinitiator is added to the resin/magnetic powder mixture to the extent of from about 0.5 to about 10 weight percent, typically about 2 to 10 weight percent, and more preferably about 2 to 4 weight percent, based upon the weight of the resin. To ensure that the magnetic particles are uniformly dispersed throughout the resin the mixture should be blended in a mixer. Alternatively, a solvent for the resin may be employed during the particle blending operation after which the solvent may be removed.

Application Process

Application of the polymer/magnetic mixture onto the badge stock poses no technological difficulties. As is a common practice in the industry the very high coercivity particles/polymer matrix materials of this invention may be produced as films by rolling or casting the material onto the card/badge stock backing, or as films/tapes per se. These processes can produce films much thinner than the 1 mil thickness required by the ISO and ANSI standards for magnetic stripes. A solvent may be employed during the film production process which is later removed.

As these magnetic stripes are more resistant to magnetic means of data alteration, a criminal may find it more feasible to remove the magnetic stripe and apply a new counterfeit one than to attempt to alter the existing stripe. Although it is not a trivial task, given enough time, some adversary may devise a method to attack the stripe of this invention via heating, chemical, or physical means. To avoid this problem, the polymer and/or solvent used to transport the magnetic particles onto the badge and/or card stock preferably should also contain an anti-tampering element. As an example, this anti-tampering device may be dye filled micro-capsules that would be pressure, chemical, and heat sensitive. Any attempt to tamper with the mag-stripe should cause the capsules to rupture and permanently stain the badge and/or card stock thus indicating a tamper attempt.

The actual application process for applying the magnetic stripe material includes several steps. The first step is to prepare the badge/card stock so that the best possible bond can be obtained between it and the magnetic stripe. Wherein for good spreading characteristics the polymer requires the addition of some type of solvent to thin its consistency, the solvent preferably should be selected to also be reactive to the surface of the badge/card stock causing it to soften slightly as the polymer mixture is applied. This softening process will cause the surface molecules of the badge/card stock to intermingle with a portion of the polymer mixture, forming a very strong bond. If a still stronger bond is required or if the magnetic particle/resin mixture does not require thinning, the badge/card surface can also be roughened to allow the polymer mixture to penetrate into the surface of the badge. This roughening process can also serve a second purpose of helping to prevent a counterfeiter from removing a valid magnetic stripe since a portion of the particle/resin mixture and hence the rotated magnetic materials will actually be located under the surface of the badge.

After the stripes have been dried, and if the magnetic particles have not yet been magnetized, the stripes must be placed into very large albeit short duration magnetic fields to be poled. Magnetic fields of these strengths can be produced by large conveniently available electro-magnets.

To magnetically saturate high coercivity rare-earth magnetic materials, a high magnetic field is necessary. For example, for a $Nd_2Fe_{14}B$ powder a field of 35,000 Oe should be applied to fully magnetize the material. The magnetization process involves the growth of domains within the particles that are aligned with their magnetization directions parallel to the direction of the applied field at the expense of those that are not so aligned. Because domain wall motion can occur rapidly, the magnetizing field need be applied for only a short time (<1 ms). Since this stripe production process may require that the particles be unmagnetized when the stripe is formed, the magnetization process may be done when the particles are in a stripe of uncured polymer. A resistance-inductance-capacitance (RLC,) circuit can be used to minimize particle motion during magnetization and to conveniently produce a sufficiently strong magnetizing field. In a circuit, charge stored in the capacitor is discharged across an inductor and resistor to produce a magnetic field in the inductor coil. As an example a theoretical magnetic field produced in a coil of this type is a function of time. When the capacitors are charged to 50 V the magnetic field peaks at 70 kOe and is above 50 kOe for about 2 ms. The actual field will be somewhat lower because of factors such as resistance in the circuit wires and the switch, but it should be high enough to saturate the $SmCo_5$ and the $Nd_2Fe_{14}B$ powders. Particles of $Nd_2Fe_{14}B$ tend to be flat platelets with their easy axis of magnetization orthogonal to the surface of the plate. As a result, a film casting approach for creating a magnetic film causes a large number of the magnetic particles to have their easy axis of magnetization perpendicular to the desired direction (in parallel with the stripe). These out-of-line particles require a much higher level of magnetic field to force the magnetic poles off the easy axis onto another axis. Because these fields are much higher than those recommended to pole the magnetic powders, a certain percentage of the particles will not be totally saturated. This could cause less than total saturation to be achieved with the poling coil.

In commercial applications, all particles should be thoroughly saturated. If they are not, they can contribute to non-return-to-zero (NRZ) errors and spiking errors. These two phenomena, caused principally by unsaturated and improperly oriented particles, cause the read-back signal on a magnetic stripe reader to have spikes, "saddles," and "floating" grounds. To ensure complete saturation, it may be necessary to partially pole the particles, induce them to rotate their easy axes in parallel to the poling field, and then finish the poling process.

The now complete encodeable badges can be stored for a fairly long time in a light safe environment without worrying that the polymer will begin to cross-link and harden the stripes. Further, provided the photoinitiator and/or photo-crosslinking agent chosen have a high enough reciprocity failure level, short term handling of the uncured stripes under normal industrial lighting during the encoding process should pose no problem.

Encoding Process

The generic encoding process required to program the stripes is as follows:

1. The stripes, the resin matrix of which at ambient conditions is physically rigid, must be softened by heating to allow the particles to be rotated;
2. The particles must be rotated into their correct orientations; and
3. The totality of the resin matrix of the stripe must therefore be cured to lock the particles into place.

The sub-steps of the generic process may be accomplished in a variety of ways. For instance, the entire matrix resin of the stripe may be softened and the particles in small predetermined areas of the stripe rotated; the matrix resin may soften only small predetermined areas of the stripes and then a large magnetic field induced across the stripe to rotate the particles only in the then still softened areas; or soften the entire stripe, induce a large magnetic field, and then cure only selected areas of the matrix resin after which the magnetic field is reversed. Whatever method is employed, after encoding the entirety of the matrix medium is rigidified to lock in the 180° magnetic phase encoding of the physical positioning of the magnetic particles against subsequent change of position. All of the methods work, but each requires a different amount of time to complete the encoding process and requires different complexities and costs of the components of the encoding device. Preferably the design of the encoder should minimize the combined time required to soften the matrix material, rotate the very high coercivity particles, and then cure the polymer matrix.

The largest encoding concern is how long it takes to rotate the magnetic particles in the polymer mixture. The time that is required for a roughly symmetrical particle to rotate into alignment with an external field is inversely proportional to the magnetic anisotrophy of the particle (which is extremely large for $Nd_2Fe_{14}B$ and $SmCo_5$) and is directly proportional to the viscosity of the fluid. The rotation time approaches <1 ms for materials in polymers with viscosities <1,000 poise. The magnetic field strength needed to rotate an isolated particle is quite low, but in a magnetic stripe, particle interactions will dictate the use of a slightly higher field. For example, rotation of fully saturated loose $Nd_2Fe_{14}B$ powder occurred at 400 Oe. To rotate the particles in a polymer of the type used herein, a field of about 3,000 Oe should be sufficient.

Encoder Iterations

Encoding may be accomplished by use of multiple parallel magnetic heads, by the use of a suitable mask, and via a laser scanner. Of these methods to be described, a laser scanner methodology is preferred.

Multiple Parallel Magnetic Heads

Figure 4:
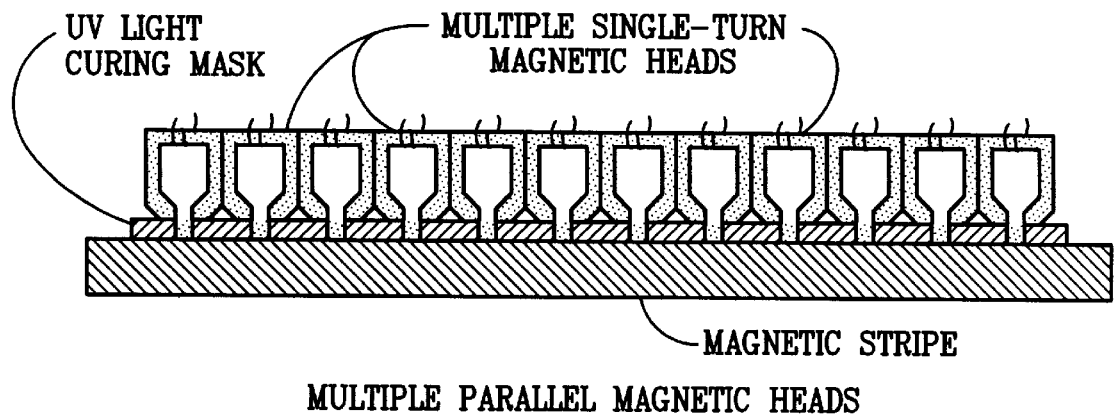
FIG. 4 illustrates an encoder for magnetic strips of the invention which comprises multiple parallel magnetic heads.

The first encoding method involves the use of a multiple parallel magnetic head assembly with which to rotate the particles in each individual flux reversal. See FIG. 4. This magnetic heat is capable of correctly rotating each individual flux reversal of the magnetic stripe simultaneously. The encoding process entails heating the entire stripe to soften the matrix resin. Once this stripe is softened, the magnetic head is brought into very close proximity to the magnetic stripe and then each sub-head induces a magnetic field corresponding to the polarity required for that flux reversal. A thin quartz light guide (not illustrated) then directs intense UV light from the side of the magnetic head assembly onto the flux reversals to cure the material.

Optical Mask

Figure 5:
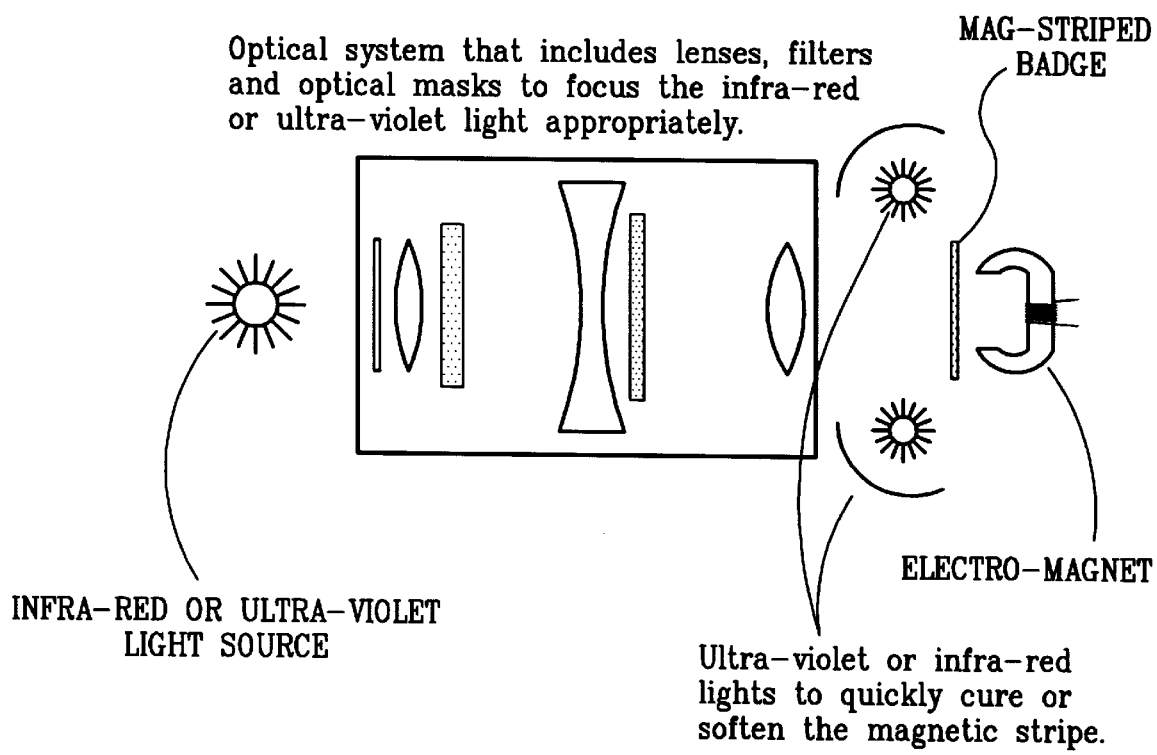
FIG. 5 illustrates an encoder for magnetic strips of the invention which comprises an optical mask encoder.
Figure 6:
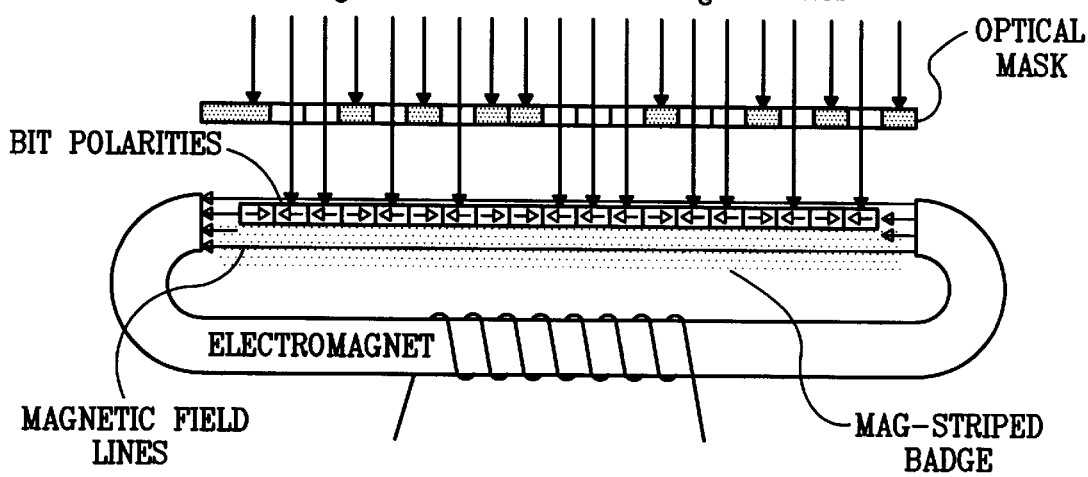
FIG. 6 schematically illustrates the encoding of a magnetic stripe of this invention by an optical mask encoder.

Encoding may be accomplished by a computer controller optical mask or a one time disposable mask to image either infrared (IR) light to soften the matrix material or UV light to cure the matrix material the stripe. See FIG. 5. To use IR, the magnetic stripes would have to be poled and all of the magnetic particles would be aligned in the same direction. See FIG. 6. Once poled, the infrared light is used to selectively soften desired flux reversals of the stripe, and an external magnetic field then rotates the magnetic particles in the softened matrix material (flux reversals) into orientations opposite those induced by the initial poling. Once the particles are rotated, the entire stripe is energetically irradiated, preferably with ultraviolet light, to cure the polymer matrix.

It is also possible to use an optical mask to image selected flux reversals with UV light. This is accomplished by softening the matrix material of the stripe by heat, rotate all of the particles into a particular orientation, and then image UV light only on selected flux reversals. Those discrete areas would be cured, thereby locking the particles in those flux reversals into place. The external magnetic field is then reversed to rotate all of the remaining particles by 180 degrees after which the remainder of the stripe is UV cured.

Laser Scanners

Figure 7:
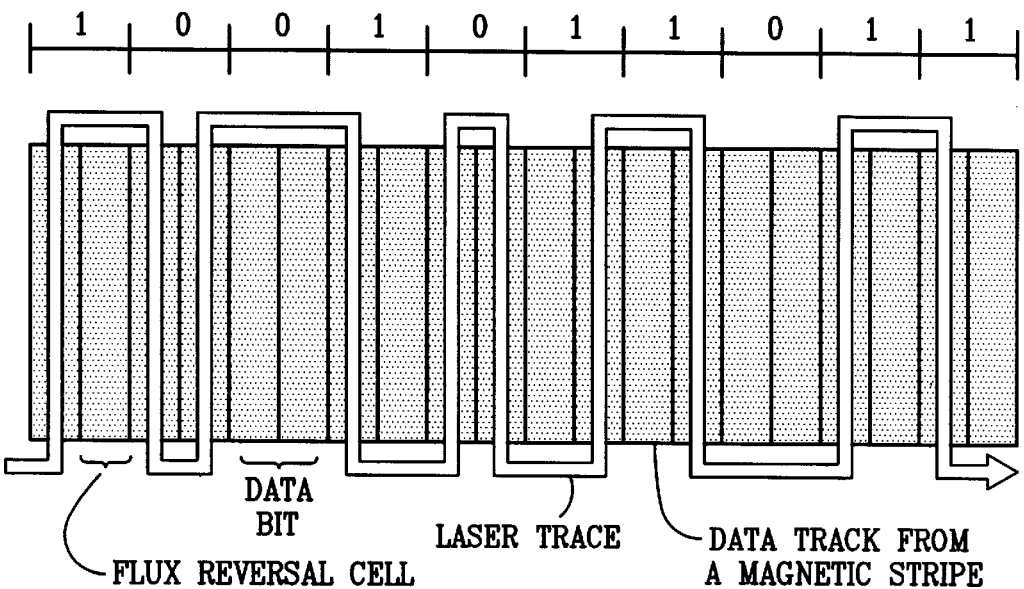
FIG. 7 schematically illustrates encoding of a magnetic stripe of this invention by a laser trace pattern.
Figure 8:
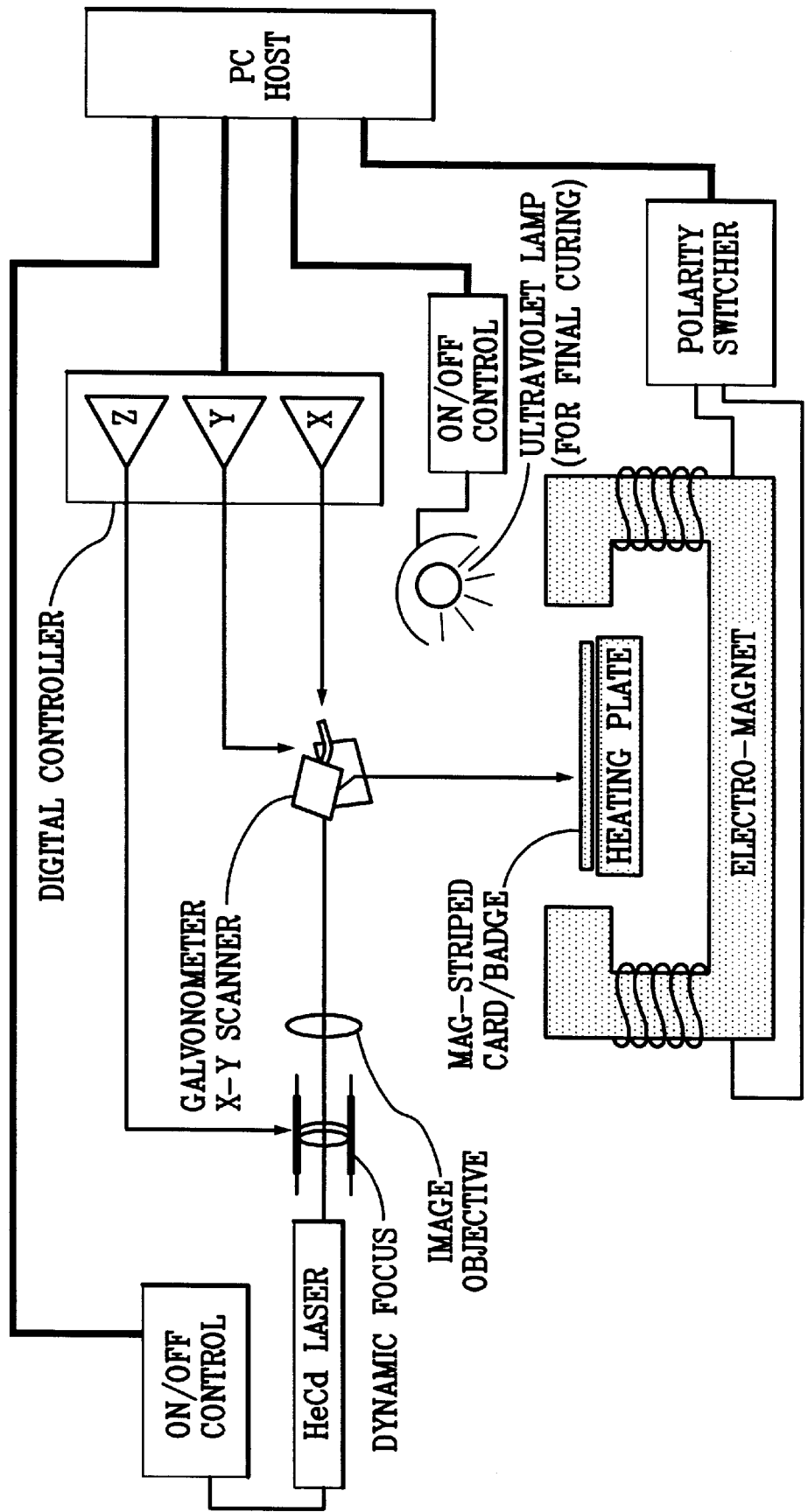
FIG. 8 schematically illustrates a laser trace magnetic stripe encoder which employs a two axis galvanometric scanner.

A laser scanner encoding method may use a two dimensional galvanometric laser scanner to selectively harden individual flux reversals of a softened stripe. This process encodes the stripes by softening the matrix material and then rotating the particles with an external field as previously described. But, instead of imaging the pattern onto the stripe with an optical mask, a two dimensional laser scanner is used to trace (and cure) the pattern of flux reversals that correspond to a particular magnetic orientation. See FIG. 7. Once the first set of flux reversals are cured, the external magnetic field is reversed. After the particles in the uncured flux reversals have rotated, the entire stripe is exposed to intense UV light to ensure that not only are the second set of flux reversals cured, but that the entire stripe is completely hardened. FIG. 8 shows a preferred configuration for a galvanometric scanning encoder.

Most preferred for laser scanning encodement is a system as illustrated in FIGS. 9 and 10. An encoding device was constructed consisting of an ultraviolet helium-cadmium (HeCd) laser operating at 325 nm, an optical system, and an electromagnet. The optical system used a shutter, a cylindrical lens, and a translational stage. The cylindrical lenses are used to line focus the incident light. Motion of the line across the medium, coordinated with temporal modulation of the beam, permits the writing of a bar of any required width by keeping the width of the line focus, or point spread function, much narrower than the required width of the magnetic stripe. FIG. 9 illustrates the concept.

Exposure of the photopolymer is accomplished with an HeCd laser operating at 325 nm. This wavelength was chosen because it is centered at the sensitivity peak of a photopolymer that could otherwise be handled under room light conditions. A beam expander and cylindrical lens are used to focus the laser beam into a line focus. A fast mechanical shutter is used to modulate the beam intensity on or off. A single-axis stepper-motor-driven stage is used to scan the beam across the magnetic stripe in constant velocity as the beam is modulated by translating the turn mirror and lens together on the stage. The optical train is shown schematically in FIG. 10.

The beam writing optics were optically analyzed by using Zemax-EE, an optical design program. The analysis shows that a 5.7-mm-dia. laser beam focused by a Newport Corp. CPX050 fusedsilica cylindrical lens with a 50-mm focal length will form a line focus that has a geometric width of 8 $\mu$m which is well within the requirements needed for standard bit/inch patterns.

The laser source is a Liconix Model No. 4270NB HeCd laser with single-mode or multimode mirror sets for operation at 325 nm. The beam train consists of a 4-power Newport HB-4XAR.10 Galilean beam expander, three beam steering mirrors, and a Newport CPX050 cylindrical lens. The cylindrical lens is held in a Newport LP2B 5-Axis lens mount and mounted to the mechanical stage. One of the beam steering mirrors is also mounted to the stage and serves to deviate the beam down to the lens, which focuses the light onto the sample platform. All optics are coated with multilayer dielectric coatings chosen to enhance reflectivities on mirrors and suppress reflective losses on lens components.

The shutter/modulator is a NM laser Products Model No. LS500 electromechanical shutter operated by a CX2250 controller. The modulation rate of the system is in excess of 250 Hz, although the practical limit is set by the speed of the controlling computer and input/output (I/O) interface.

The mechanical stage is an Aerotech Model No. ATS1510 with a 4000-step/revolution stepper motor. The stage has a total travel of 4 inches at a maximum velocity of 4 in./s. The stage is powered by a Unidex 14R-4-AX1-DM4005-40 control chassis and power amplifiers and an interface card system. The interface is installed in an IBM PC-AT computer. This interface card also has several user-definable I/O ports, one of which is designated to control the mechanical shutter.

Software to drive the stage and shutter is written in Microsoft QuickBasic version 4.5, using a demonstration program provided by Aerotech as the framework. Functions or modules written include shutter operations (open/close), step wedge generation, bitpattern generation, and focus calibration. Computer execution speed is not a problem because the controller has a command buffer on-board. The program to write a bit pattern had to take into account the status of the previous bar to determine whether or not a bar should be exposed or left blank. The sensitivity, E, of the photopolymer is approximately 250 mJ/cm$^2$. Power, P, onto the exposure plane was measured by using a calibrated photodetector at 10 mW. The line height, h, was 5.7 mm. Therefore, to achieve the necessary total exposure for the particular lower power laser used, the line had to be scanned at a scan rate, $v_s$, given by $v_s = P/(h*E) = 0.66$ mm/s. Note that this relationship is independent of the width of the focused laser line. Line width affects only the ultimate resolution with which pattern can be recorded.

This rate is somewhat slow for a production environment, with a more powerful laser, such as a 500-mW laser, a photosensitizer adjusted to match the wavelength, and a shutter/modulator operating at 250 Hz, scan rates exceeding 40 mm/s are possible.

Although this invention has been described with reference to the embodiments thereof which are presently preferred, from the above description one should appreciate that one skilled in the art may appreciate changes and modifications therein which do not in their scope or spirit depart in substance from the invention herein before described and hereafter claimed.

We claim:

1. A tamper resistant magnetic stripe for encoding by magnetic particle rotation comprising:

a radiation crosslinkable material which is solid at ambient temperature and which before cross-linking has a viscosity of 1,200 poise or less at 40° C.; and magnetized particles of a magnetic composition in suspended distribution throughout said crosslinkable material, said particles having a coercivity of at least 5 kOe;

said particles in selected regions of said material being substantially all similarly aligned with respect to their magnetic polarity and the material of said regions is cross-linked, and in the remaining regions of said material the particles therein being substantially all similarly aligned with respect to their magnetic polarity in a direction which is 180° opposed to said particles in said selected cross-linked regions;

wherein said selected and remaining regions alternate along said stripe to define a magnetic code.

2. The magnetic stripe of claim 1, wherein said particles are of a composition of the formula $RM_x$, $R_2M_{17}$, or $R_2Fe_{14}B$ wherein R is Y or a rare earth metal, M is Mn or a Group VIII transition metal, and x is from 1 to 5.

3. The magnetic stripe of claim 2, wherein the particles are of a composition of the formula $SmCo_5$ or $NdFe_{14}B$.

4. The magnetic stripe of claim 3, wherein the particles are of an average size of 10 microns or less.

5. The magnetic stripe of claim 1, wherein the particles are present in the cross-linkable material to the extent of from about 1 to about 20 volume percent of said cross-linkable material.

6. The magnetic stripe of claim 1, wherein all of the cross-linkable material is cross-linked.

7. The magnetic stripe of claim 6, wherein said particles are $SmCo_5$ or $Nd_2Fe_{14}B$.

8. The magnetic stripe of claim 1, wherein the cross-linkable material comprises a urethane-acrylate resin.

9. The magnetic stripe of claim 8, wherein the urethane-acrylate resin contains from about 0.5 to about 10 weight percent of a photoinitiator responsive to radiation of a wavelength of from about 220 to about 600.

10. The magnetic stripe of claim 9, wherein the photoinitiator is 2-methyl-1-(4-(methylthio)phenyl)-2-(4-morpholinyl)-1-propanone.

11. The magnetic stripe of claim 10, wherein the particles are of a composition of the formula $RM_x$, $R_2M_{17}$, or $R_2Fe_{14}B$ wherein R is Y or a rare earth metal, M is Mn or a Group VIII transition metal, and x is from 1 to 5.

12. The magnetic stripe of claim 11, wherein the particles are of a composition of the formula $SmCo_5$ or $NdFe_{14}B$.

13. The magnetic stripe of claim 12, wherein the particles are of an average size of 10 microns or less.

14. The magnetic stripe of claim 12, wherein all of the cross-linkable material is cross-linked.

15. The magnetic stripe of claim 8, wherein all of the cross-linkable material is cross-linked.

16. The magnetic stripe of claim 15, wherein said particles are $SmCo_5$ or $Nd_2Fe_{14}B$.

17. The magnetic stripe of claim 1, wherein said magnetic code is an F/2F pattern.

18. The magnetic stripe of claim 1 wherein the viscosity of said material is between 300 and 1200 poise at 40° C.

19. A method for encoding a magnetic stripe comprising a radiation cross-linkable material which is solid at ambient temperatures which before cross-linking has a viscosity of 1,200 poise or less at 40° C. and high coercivity particles of a ferromagnetic composition in suspended distribution throughout said cross-linkable material wherein said particles are magnetized and substantially all particles are similarly aligned with respect to their magnetic polarity, comprising the steps of exposing only selected regions of the cross-linkable material to radiation to cross-link the material in said exposed region, subjecting the entirety of the material while it is at a temperature at which the non-radiation exposed regions thereof are of a viscosity of 1,200 poise or less to a magnetic field that will rotate the magnetic particles therein by 180° with respect to the particles in the radiation exposed regions of the material, and finally exposing the entirety of said material to radiation to cross-link the remainder of said material.

20. The method of claim 19, wherein prior to exposure of the entirety of the material to radiation the material is subject to heating to a temperature sufficient to produce a viscosity of between 300 and 1200 poise.

21. The method of claim 19, wherein said particles have a coercivity of at least 5 kOe.

22. The method of claim 21, wherein the regions of alternating magnetic particles define an F/2F pattern.

* * * * *